(12) United States Patent
Hähnle

(10) Patent No.: US 10,146,504 B2
(45) Date of Patent: Dec. 4, 2018

(54) DIVISION USING THE NEWTON-RAPHSON METHOD

(71) Applicant: Advanced Micro Devices, Inc., Sunnyvale, CA (US)

(72) Inventor: Nicolai Hähnle, Polling (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/442,144

(22) Filed: Feb. 24, 2017

(65) Prior Publication Data

US 2018/0246700 A1    Aug. 30, 2018

(51) Int. Cl.
*G06F 7/52* (2006.01)
*G06F 7/487* (2006.01)
*G06F 17/17* (2006.01)

(52) U.S. Cl.
CPC ............. *G06F 7/52* (2013.01); *G06F 7/487* (2013.01); *G06F 17/17* (2013.01)

(58) Field of Classification Search
CPC ............. G06F 7/52; G06F 7/487; G06F 17/17
USPC ........................ 708/502, 504, 654
See application file for complete search history.

(56) References Cited

U.S. PATENT DOCUMENTS

| 7,191,204 B1* | 3/2007 | Ogata ............... G06F 7/535 708/654 |
| 8,938,485 B1 | 1/2015 | Vanderspek |
| 2006/0064454 A1* | 3/2006 | Wang ............... G06F 1/035 708/651 |
| 2009/0089346 A1* | 4/2009 | Bailey ............... G06F 7/535 708/504 |
| 2016/0085511 A1* | 3/2016 | Yukiyama ......... G06F 7/535 708/209 |

* cited by examiner

*Primary Examiner* — Tan V Mai
(74) *Attorney, Agent, or Firm* — Meyertons Hood Kivlin Kowert and Goetzel PC; Rory D. Rankin

(57) ABSTRACT

Systems, apparatuses, and methods for performing a division operation are disclosed. In one embodiment, a processor includes at least one arithmetic logic unit and a register file. In response to detecting a request to perform a division operation between a dividend and a divisor, the processor generates an initial approximation of the reciprocal of the divisor. Then, the processor converts the initial approximation of the reciprocal of the divisor into a fractional fixed point representation. The processor also introduces a small error into the initial approximation of the reciprocal of the divisor. Then, the processor implements one or more Newton-Raphson iterations for refining the approximation of the reciprocal and then multiplies the final reciprocal value by the dividend to generate the quotient.

14 Claims, 11 Drawing Sheets

DIVISION USING THE NEWTON-RAPHSON METHOD

BACKGROUND

Description of the Related Art

A graphics processing unit (GPU) is a complex integrated circuit that is configured to perform graphics-processing tasks. For example, a GPU can execute graphics-processing tasks required by an end-user application, such as a video-game application. GPUs are also increasingly being used to perform other tasks which are unrelated to graphics. The GPU can be a discrete device or can be included in the same device as another processor, such as a central processing unit (CPU). Other types of processors (e.g., application specific integrated circuits (ASICs), field programmable gate arrays (FPGAs), digital signal processors (DSPs)) can perform tasks which are typically performed by a GPU.

Floating point division operations are used in many types of graphics applications which are executed on GPUs. For example, image transformation operations rely on large numbers of multiplication and division operations. A division operation is typically one of the more complicated and lengthy operations performed by an arithmetic logic unit (ALU) of a processor. A division operation takes as inputs a dividend and a divisor and computes a quotient as the result. Different types of division algorithms are available for implementing a division operation in a processor. A first type of division algorithm utilizes subtraction as the iterative operator. Nonrestoring division is an example of the first type of division algorithm. The first type of division algorithm is typically slow to execute, as the execution time is proportional to the length (i.e., number of bits) of the divisor. A second type of division algorithm utilizes multiplication as the iterative operator. Algorithms of the second type of division obtain a reciprocal of the divisor, and then multiply the reciprocal by the dividend to obtain a quotient. Different techniques for generating the reciprocal include series expansion and the Newton-Raphson method.

The Newton-Raphson method involves generating the reciprocal 1/Q of the divisor Q by finding the zero of the equation f(X)=1/X−Q using an iterative process. The Newton-Raphson iterations to obtain the reciprocal X=1/Q are based on the following formula: $X_{i+1}=X_i*(2-Q*X_i)$. The initial value $X_0$ is an initial approximation of the reciprocal. Once the reciprocal has been calculated with enough bits of precision, the final reciprocal X is multiplied by the dividend P to obtain the quotient.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
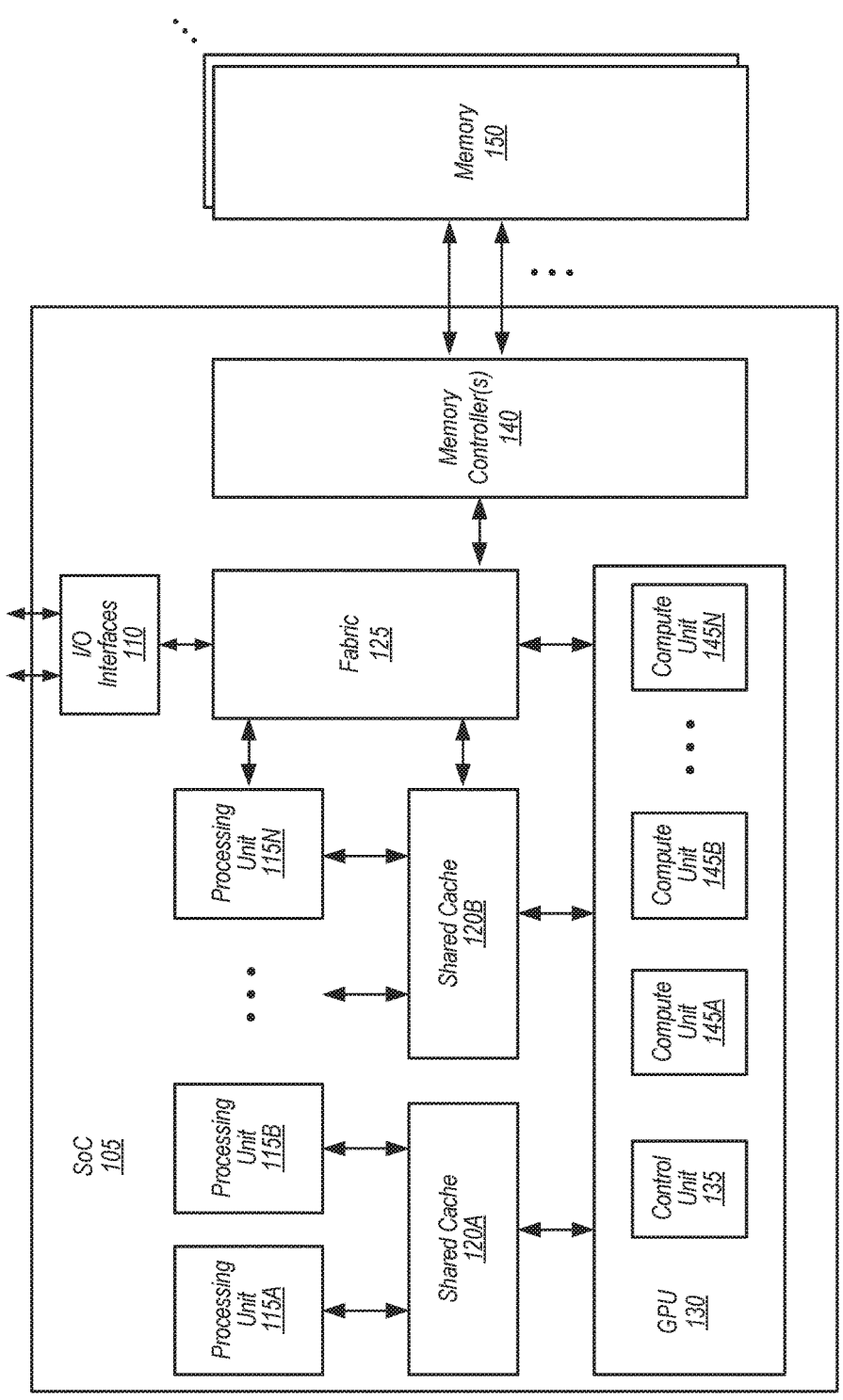
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing division operations are disclosed. In one embodiment, a processor includes at least an arithmetic logic unit (ALU) and a register file. In one embodiment, in response to detecting a request to perform a division operation of a dividend (i.e., P) and a divisor (i.e., Q), the processor is configured to generate an initial approximation (i.e., $X_0$) of the reciprocal of the divisor. In one embodiment, the divisor is in an integer format, and the processor converts the divisor to a floating point format so as to use a floating point reciprocal unit to generate the initial approximation of the reciprocal.

In one embodiment, the processor converts the initial approximation of the reciprocal of the divisor into a 1·(N−1) fractional fixed point format, where one bit is above the radix point and (N−1) bits are below the radix point, with N being a positive integer. The size of N (e.g., 32 bits, 64 bits) can vary from embodiment to embodiment. Additionally, the processor introduces a small bias (i.e., an error) into the initial approximation of the reciprocal of the divisor. This small bias is introduced to ensure that the initial approximation of the reciprocal of the divisor is different from one when the divisor equals one. The small bias can be introduced before or after the initial approximation of the reciprocal of the divisor is converted into the 1·(N−1) fractional fixed point format.

Next, an iteration of the Newton-Raphson algorithm is performed to generate a second approximation (i.e., $X_i$), of the reciprocal, with the second approximation a more precise approximation of the reciprocal than the first approximation. The iteration calculates the second approximation as $X_i=X_0(2-QX_0)$, wherein Q is the divisor. In some embodiments, one or more additional Newton-Raphson iterations can be performed to generate additional approximations of the reciprocal with greater precision. An advantage of generating the reciprocal in this manner is that the reciprocal can be used for successive divisions by the same divisor. Once an approximation of the reciprocal has been generated with the desired amount of precision, the reciprocal is multiplied by the dividend to produce the quotient. In one embodiment, an adjustment is made to the product of the reciprocal multiplied by the dividend to generate the final quotient.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes processing units 115A-N, input/output (I/O) interfaces 110, shared caches 120A-B, fabric 125, graphics processing unit (GPU) 130, and memory controller(s) 140. SoC 105 can also include other components not shown in FIG. 1 to avoid obscuring the figure. Processing units 115A-N are representative of any number and type of processing units. In one embodiment, processing units 115A-N are central processing unit (CPU) cores. In another embodiment, one or more of processing units 115A-N are other types of processing units (e.g., application specific integrated circuit (ASIC), field programmable gate array (FPGA), digital signal processor (DSP)). Processing units 115A-N are coupled to shared caches 120A-B and fabric 125.

In one embodiment, processing units 115A-N are configured to execute instructions of a particular instruction set architecture (ISA). Each processing unit 115A-N includes one or more execution units, cache memories, schedulers, branch prediction circuits, and so forth. In one embodiment, the processing units 115A-N are configured to execute the main control software of system 100, such as an operating system. Generally, software executed by processing units 115A-N during use can control the other components of system 100 to realize the desired functionality of system 100. Processing units 115A-N can also execute other software, such as application programs.

GPU 130 includes at least control unit 135 and compute units 145A-N which are representative of any number and type of compute units that are used for graphics or general-purpose processing. GPU 130 is coupled to shared caches 120A-B and fabric 125. In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In various embodiments, the graphics operations and non-graphics related operations executed by GPU 130 include division operations. In one embodiment, GPU 130 utilizes the Newton-Raphson method to perform the division operation of a dividend by a divisor to produce a quotient. In one embodiment, the dividend and divisor are integer operands (i.e., stored in an integer representation). In one embodiment, GPU 130 initiates the division operation by generating an initial approximation of the reciprocal of the divisor. Then, GPU 130 adds a small bias to the initial approximation of the reciprocal of the divisor. This small bias can be introduced to the initial approximation of the reciprocal of the divisor in any suitable manner, with different embodiments utilizing different techniques for introducing the small bias. These embodiments include adding a small number to the initial approximation of the reciprocal of the divisor, performing an OR operation with a small number and the initial approximation of the reciprocal of the divisor, performing an XOR operation with a small number and the initial approximation of the reciprocal of the divisor, or other similar techniques. The small number can be the smallest possible value (i.e., all 0 bits except for a 1 in the least significant bit (LSB)) in integer representation, floating point representation, or other type of representation. Also, GPU 130 converts the initial approximation of the reciprocal of the divisor into a $1 \cdot (N-1)$ fractional fixed point representation, with N the size of the operand, and with N being any integer which can vary from architecture to architecture. It is noted that the bias can be introduced to the initial approximation of the reciprocal of the divisor before or after converting to the $1 \cdot (N-1)$ fractional fixed point representation.

Then, the divisor performs a Newton-Raphson iteration by generating a second approximation of the reciprocal of the divisor, with the second approximation a more accurate (i.e., more bits of precision) version of the reciprocal. Because of the way the initial approximation of the reciprocal of the divisor was converted to the $1 \cdot (N-1)$ fractional fixed point representation, the second approximation of the reciprocal of the divisor can be calculated in an efficient manner. To calculate the second approximation of the reciprocal of the divisor, the initial approximation of the reciprocal of the divisor is multiplied by the divisor and then subtracted from two. The result of the multiply and subtraction steps is multiplied by the initial approximation of the reciprocal of the divisor to generate a product. This product is the second approximation of the reciprocal of the divisor, which is in a $2 \cdot (2N-1)$ fractional fixed point representation. In one embodiment, when N is 32, the product is in a 2.62 fractional fixed point representation. In some embodiments, additional Newton-Raphson iterations can be performed to obtain a reciprocal with additional precision.

Then, the upper "N" fractional bits are extracted from the second approximation of the reciprocal of the divisor. These are the "N" bits which are below the radix point. These "N" fractional bits are then multiplied by the dividend to generate an initial quotient value. Then, an adjustment is made to the initial quotient value to generate a final quotient value. For example, in one embodiment, a small number is added to the initial quotient value to generate the final quotient value. This final quotient value is used as the result of the division operation.

It is noted that the division operation described above can be performed in accordance with one embodiment. In other embodiments, variations to one or more of the above steps, inclusions of other steps, or omitting one or more of the above steps can be implemented for division operations performed in other embodiments. It is also noted that in other embodiments, other types of processors (e.g., DSP, FPGA, ASIC, CPU) or dedicated logic can perform division operations in the same manner as is described for GPU 130. These other types of processors can be included in system 100, either taking the place of GPU 130 or being implemented in addition to GPU 130. In another embodiment, one or more of these other types of processors can be utilized in a computing system which is structured in a different manner than what is shown in FIG. 1. For example, in a further embodiment, a stand-alone GPU 130, without the processing units 115A-N, is configured to perform division operations in accordance with the descriptions included in this disclosure.

I/O interfaces 110 are coupled to fabric 125, and I/O interfaces 110 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 110. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random-access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 115A-N and/or compute units 145A-N. In some embodiments, SoC 105 includes shared caches 120A-B that are utilized by processing units 115A-N and compute units 145A-N. In one embodiment, caches 120A-B are part of a cache subsystem including a cache controller.

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
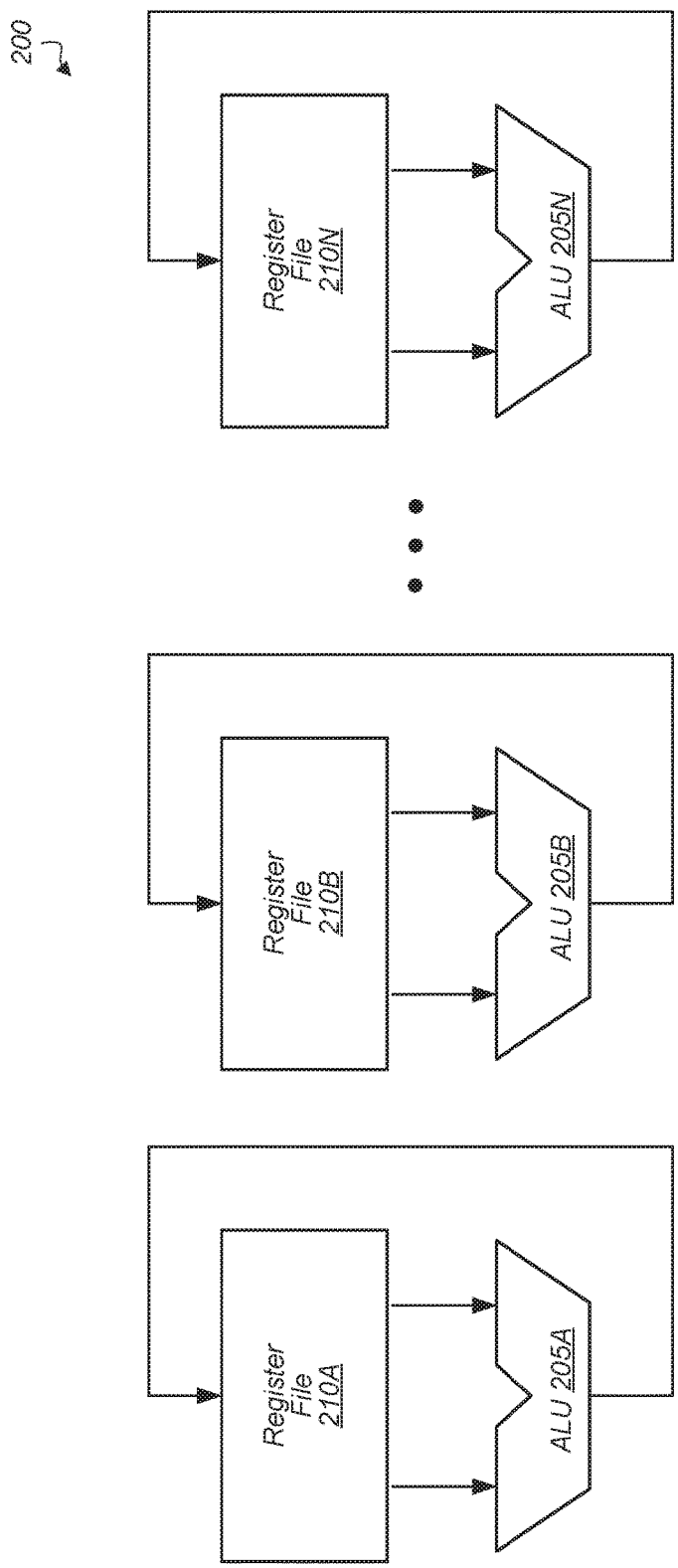
FIG. 2 is a block diagram of one embodiment of a compute unit.

Turning now to FIG. 2, a block diagram of one embodiment of a compute unit 200 is shown. In one embodiment, the components of compute unit 200 are implemented within one or more of compute units 145A-N of GPU 130 (of FIG. 1). As shown in FIG. 2, compute unit 200 includes at least arithmetic logic units (ALUs) 205A-N and register files 210A-N. It is noted that compute unit 200 can include other logic which is not shown in FIG. 2 to avoid obscuring the figure. ALUs 205A-N are representative of any number of ALUs, with the number varying from embodiment to embodiment. It is noted that an ALU can also be referred to more generally as an execution unit. Although multiple ALUs 205A-N are shown in FIG. 2, it is noted that some embodiments can implement a single ALU. Similarly, register files 210A-N are representative of any number of register files, with the number varying from embodiment to embodiment.

Each ALU 205A-N accepts any number of data operands as inputs from a corresponding register file 210A-N. Each ALU 205A-N is configured to perform a specific arithmetic operation (e.g., addition, subtraction, multiplication) based on a control input. Depending on which arithmetic operation is specified by the control input, ALUs 205A-N are configured to output an arithmetic result to the corresponding register file 210A-N. Each register file 210A-N allows a plurality of operands to be stored and accessed by a corresponding ALU 205A-N. Each register file 210A-N includes a plurality of registers. The output generated by ALUs 205A-N can be stored in any selected register in the corresponding register file 210A-N.

Figure 3:
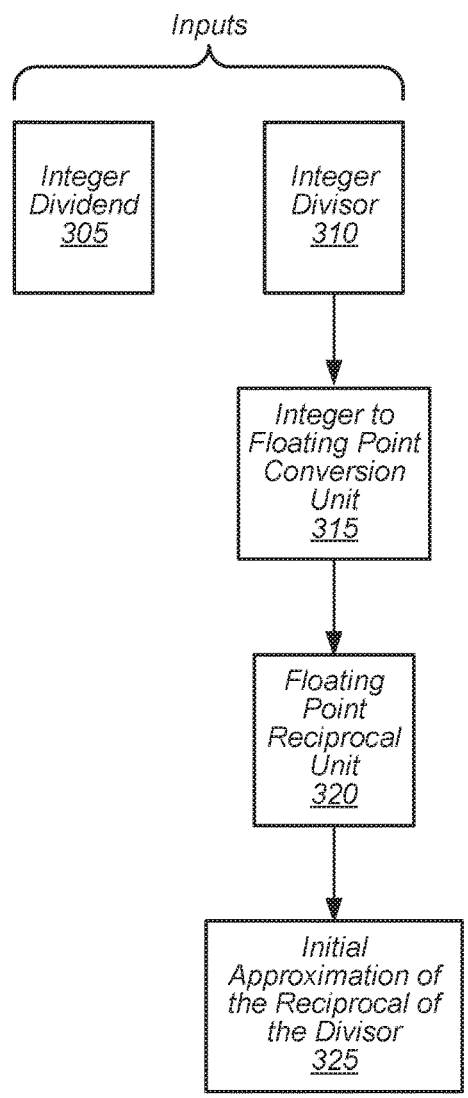
FIG. 3 is a block diagram of one embodiment of a first portion of a divide operation pipeline.

Referring now to FIG. 3, a block diagram of one embodiment of a first portion of a divide operation pipeline is shown. The inputs for the divide operation include an integer dividend 305 and an integer divisor 310. The inputs can be received by a processor (e.g., GPU, FPGA, ASIC, DSP), a compute unit, an execution unit, or any of various other types of computing devices or systems. As a first step in the divide operation pipeline, the integer divisor 310 is input to an integer to floating point conversion unit to convert the divisor 310 to a floating point representation. Then, the floating point representation of the divisor is input to floating point reciprocal unit 320. The output of floating point reciprocal unit 310 is initial approximation of the reciprocal of the divisor 325. It is noted that the first portion of the divide operation pipeline shown in FIG. 3 can be implemented using any suitable combination of software and/or hardware.

Figure 4:
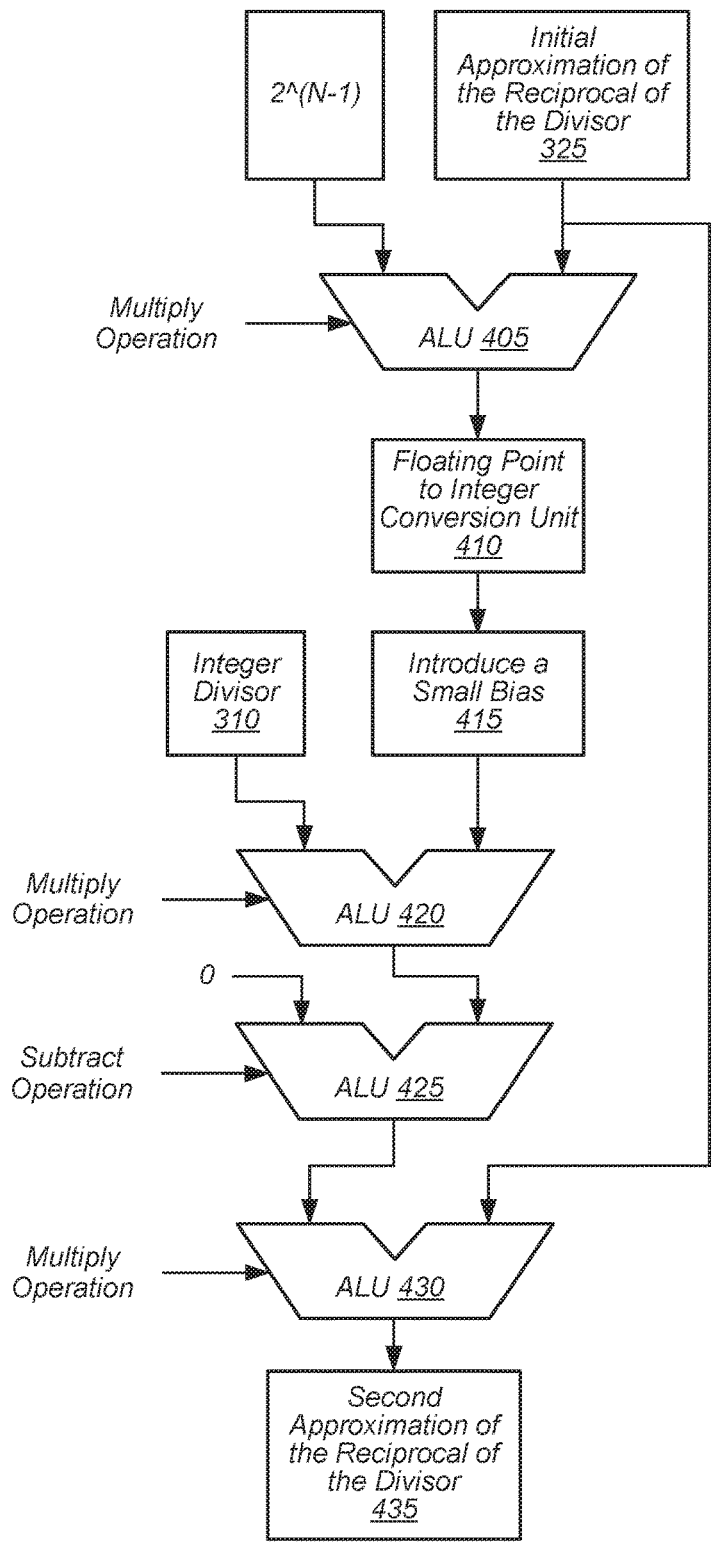
FIG. 4 is a block diagram of a second portion of a divide operation pipeline.

Turning now to FIG. 4, a block diagram of a second portion of a divide operation pipeline is shown. The initial approximation of the reciprocal of the divisor 325, generated by the logic of FIG. 3, is provided as an input to ALU 405. The other input to ALU 405 is the value of $2^{(N-1)}$, wherein N is a positive integer, and wherein N varies from embodiment to embodiment. In one embodiment, N is equal to 32, while in a second embodiment, N is equal to 64. In other embodiments, N can be equal to any other suitable value. A multiply operation is specified for ALU 405, with the output of ALU 405 provided as an input to floating point to integer conversion unit 410.

Using ALU 405 to multiply the initial approximation of the reciprocal of the divisor 325 by $2^{(N-1)}$ and then converting the product to an integer with unit 410 effectively converts the initial approximation of the reciprocal of the divisor 325 from a floating point representation to a 1·(N−1) fractional fixed point representation. Next, a small bias 415 is introduced to the output of unit 410. This small bias 415 ensures that the output of unit 410 is not equal to one when the input divisor 310 is equal to one. It is noted that the small bias 415 can be introduced prior to unit 410 in another embodiment. The small bias 415 can be introduced in any of various different manners, depending on the embodiment. An addition operation, an OR operation, or an XOR operation with a small value can be utilized in different embodiments.

Next, after the small bias 415 has been introduced to the output of unit 410, the resultant value is multiplied by integer divisor 310 using ALU 420. The output is fed to ALU 425 where it is negated (i.e., subtracted from zero). It is noted that ALU 425 can be the same ALU as ALU 420 and/or ALU 405, although they are shown as different ALU's in FIG. 4. Similarly, ALU 430 can be the same ALU as ALU 405, ALU 420, and/or ALU 425. Generally speaking, any ALU shown in FIGS. 3-5 can be reused for subsequent operations.

The output of ALU 425 is the $(2-QX_0)$ term of the Newton-Raphson formula. Then, the output of ALU 425 is coupled to an input of ALU 430 and multiplied by the initial approximation of the divisor 325. The output of ALU 430 is the second approximation of the reciprocal of the divisor

435. In other words, the output of ALU 430 is the $X_1$ term in the $X_1=X_0(2-QX_0)$ Newton-Raphson formula. It is noted that the second portion of the divide operation pipeline shown in FIG. 4 can be implemented using any suitable combination of software and/or hardware.

Figure 5:
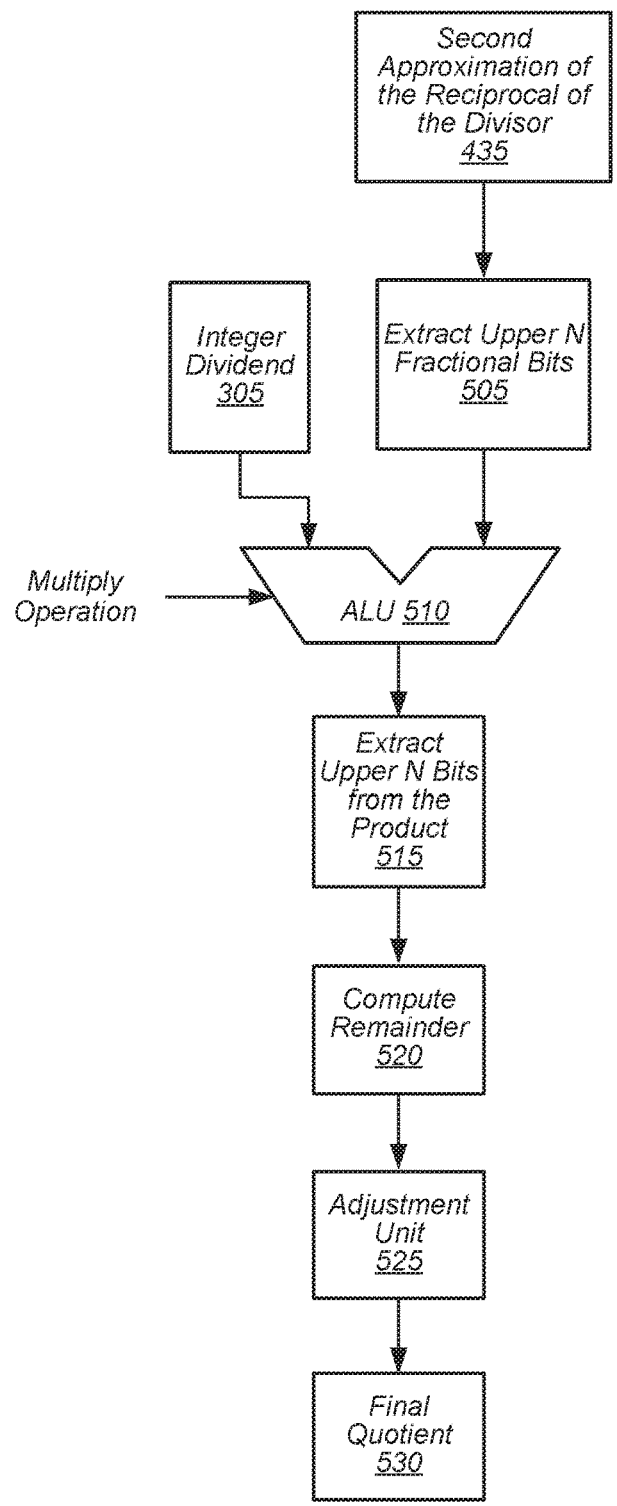
FIG. 5 is a block diagram of a third portion of a divide operation pipeline.

Referring now to FIG. 5, a block diagram of one embodiment of a third portion of a divide operation pipeline is shown. The upper N fractional bits 505 are extracted from second approximation of the reciprocal of the divisor 435. In one embodiment, the second approximation of the reciprocal of the divisor is in a 2·(2N−2) fractional fixed point representation. The upper N fractional bits 505 are the upper N bits below the radix point of the 2·(2N−2) fractional fixed point representation. It is noted that in another embodiment, one or more additional iterations of the Newton-Raphson method can be performed on the second approximation of the reciprocal of the divisor 435 to generate an approximation of the reciprocal of the divisor with more bits of precision. However, for the embodiment shown in FIG. 5, it is assumed that the second approximation of the reciprocal of the divisor 435 has a sufficient number of bits of precision.

The upper N fractional bits 505 are provided as an input to ALU 510 to be multiplied by integer dividend 305. The upper N bits 515 are extracted from the product generated by ALU 510. Then the remainder is computed in block 520, followed by one or more adjustments performed by adjustment unit 525. After the one or more adjustments, the result is the final quotient 530. The final quotient 530 is the value of the integer dividend 305 divided by the integer divisor 310. It should be understood that one or more of the steps shown in the divided operation pipeline of FIGS. 3-5 can be altered in other embodiments. Additionally, one or more additional steps can be added to the divide operation pipeline in other embodiments. It is noted that the third portion of the divide operation pipeline shown in FIG. 5 can be implemented using any suitable combination of software and/or hardware.

Figure 6:
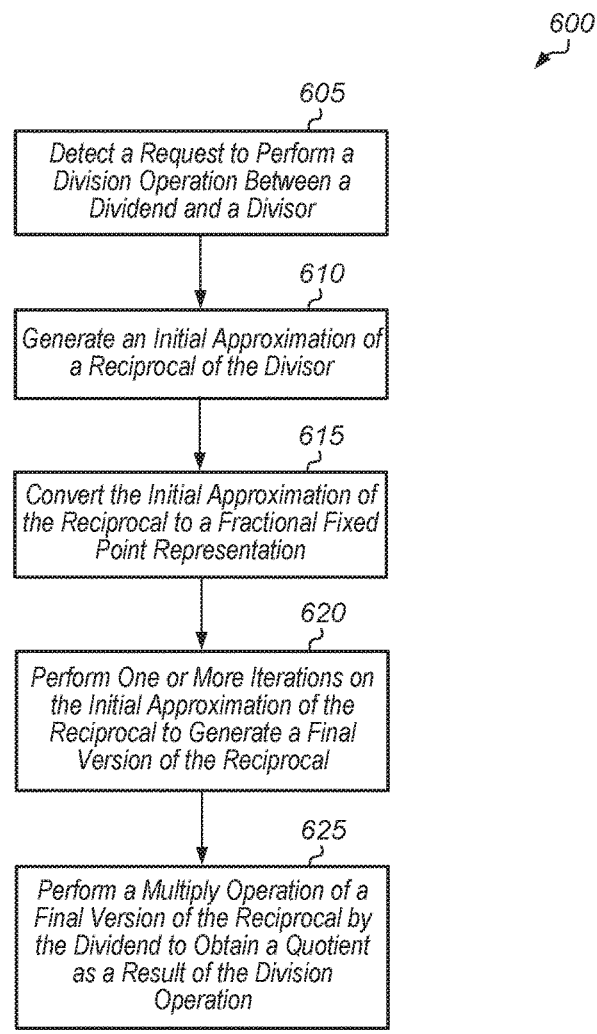
FIG. 6 is a generalized flow diagram illustrating one embodiment of a method for performing a division operation.
Figure 7:
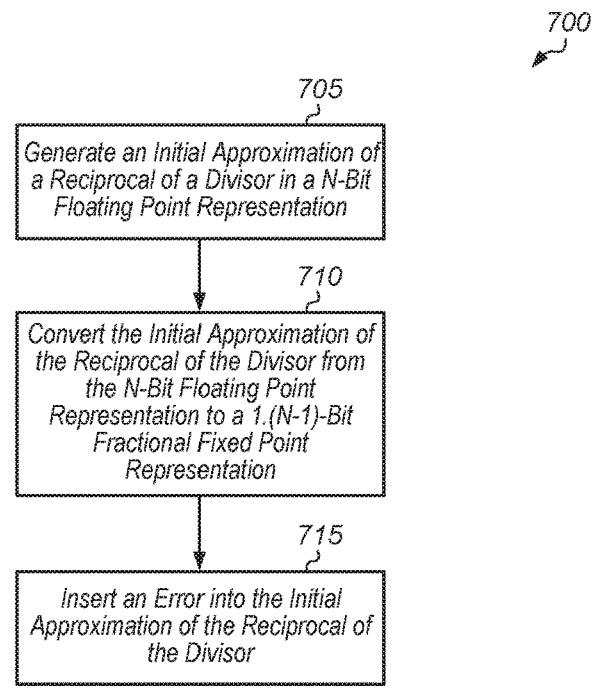
FIG. 7 is a generalized flow diagram illustrating one embodiment of a method for generating an initial approximation of a reciprocal of a divisor.
Figure 8:
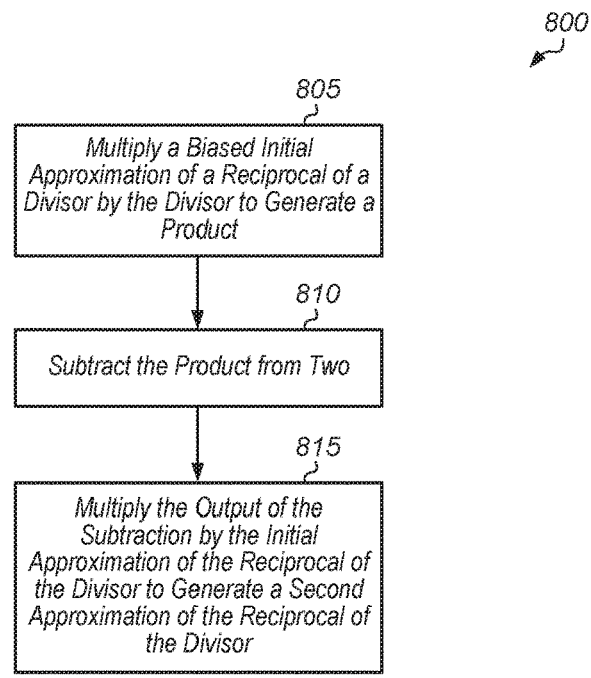
FIG. 8 is a generalized flow diagram illustrating one embodiment of a method for generating a second approximation of a reciprocal of a divisor.

Turning now to FIG. 6, one embodiment of a method 600 for performing a division operation is shown. For purposes of discussion, the steps in this embodiment and those of FIGS. 7-8 are shown in sequential order. However, it is noted that in various embodiments of the described methods, one or more of the elements described are performed concurrently, in a different order than shown, or are omitted entirely. Other additional elements are also performed as desired. Any of the various systems, apparatuses, or computing devices described herein are configured to implement method 600.

A processor detects a request to perform a division operation between a dividend and a divisor (block 605). In one embodiment, the processor includes at least one arithmetic logic unit (ALU) and a register file. In one embodiment, the ALU is a vector ALU. It is noted that the type (e.g., GPU, application specific integrated circuit (ASIC), field programmable gate array (FPGA), digital signal processor (DSP)) of processor employed to implement method 600 can vary from embodiment to embodiment.

In response to detecting the request, the processor generates an initial approximation of a reciprocal of the divisor (block 610). In one embodiment, the processor generates the initial approximation of the reciprocal of the divisor from below which is helpful for the later steps of the division operation. In one embodiment, the processor converts the divisor from an integer representation to a N-bit floating point representation prior to generating the initial approximation of the reciprocal of the divisor.

In one embodiment, the processor includes a reciprocal unit configured to generate an approximation of a reciprocal of a given input value. Next, the processor converts the initial approximation of the reciprocal to a fractional fixed point representation (block 615). In one embodiment, the processor converts the initial approximation of the reciprocal of the divisor from an N-bit floating point representation to a 1·(N−1)-bit fractional fixed point representation. Then, the processor performs one or more iterations on the initial approximation of the reciprocal to generate a final version of the reciprocal (block 620). The number of iterations can vary from embodiment to embodiment, depending on the amount of precision desired for the final version of the reciprocal. Next, the processor performs a multiply operation of a final version of the reciprocal by the dividend to obtain a quotient as a result of the division operation (block 625). After block 625, method 600 ends.

It is also noted that there are different ways of implementing method 600, depending on the embodiment. In one embodiment, method 600 is implemented in software (e.g., microcode). In one embodiment, the software can be included in a graphics driver. In another embodiment, method 600 is implemented in hardware. In other embodiments, any suitable combination of hardware and/or software can be utilized to implement method 600.

Referring now to FIG. 7, one embodiment of a method 700 for generating an initial approximation of a reciprocal of a divisor is shown. A processor generates an initial approximation of a reciprocal of a divisor in a N-bit floating point representation (block 705). In one embodiment, the initial approximation of the reciprocal of the divisor is generated using a floating point reciprocal unit. In this embodiment, if the divisor is stored in an integer representation, the divisor is converted from an integer format to a floating point format prior to performing block 705. In one embodiment, N is 32, and the initial approximation of the reciprocal is stored in a single-precision floating point representation. In another embodiment, N is 64, and the initial approximation of the reciprocal is stored in a double-precision floating point representation Then, the processor converts the initial approximation of the reciprocal of the divisor from the N-bit floating point representation to a 1·(N−1)-bit fractional fixed point representation (block 710). In a 1·(N−1)-bit fractional fixed point representation, there is one bit above the radix point and "N−1" bits are below the radix point. For example, if N is 32, then 1.31 fractional fixed point representation is utilized. Alternatively, if N is 64, then 1.63 fractional fixed point representation is utilized. In one embodiment, block 710 is implemented using two instructions. For example, a first instruction performs a floating point multiply of the initial approximation of the reciprocal by $2^{(N-1)}$, and then a second instruction converts the product of the first instruction from a floating point representation to an integer representation Also, the processor inserts an error into the initial approximation of the reciprocal of the divisor (block 715). It is noted that block 715 can be performed prior to block 710 or after block 710, depending on the embodiment. After block 715, method 700 ends. Depending on the embodiment, any of various techniques can be utilized for inserting the error into the initial approximation of the reciprocal of the divisor. For example, in one embodiment, the error can be inserted by adding a small number to the initial approximation of the reciprocal. For example, a "1" in the least significant bit (LSB) can be added to the initial approximation of the reciprocal. In another embodiment, a bitwise OR operation is performed between a small value and the initial approximation of the reciprocal. In a further embodiment, a bitwise XOR operation is performed between a small value and the initial approximation of the reciprocal. In a still further embodiment, a multiply operation between a value of one plus a small number and the initial approximation of the reciprocal is performed to insert the error.

Turning now to FIG. 8, one embodiment of a method 800 for generating a second approximation of a reciprocal of a divisor is shown. A processor multiplies a biased initial approximation of a reciprocal of a divisor by the divisor to generate a product (block 805). Then, the processor subtracts the product from two (block 810). In one embodiment, the processor negates the product, which effectively subtracts the product from two. Next, the processor multiplies the output of the subtraction by the initial approximation of the reciprocal of the divisor to generate a second approximation of the reciprocal of the divisor (block 815). In one embodiment, the second approximation of the reciprocal of the divisor is stored in a 2·(2N−2) fractional fixed point representation. After block 815, method 800 ends. It is noted that after block 815, the second approximation of the reciprocal of the divisor can be multiplied by the dividend to generate a quotient for the division operation.

Figure 9:
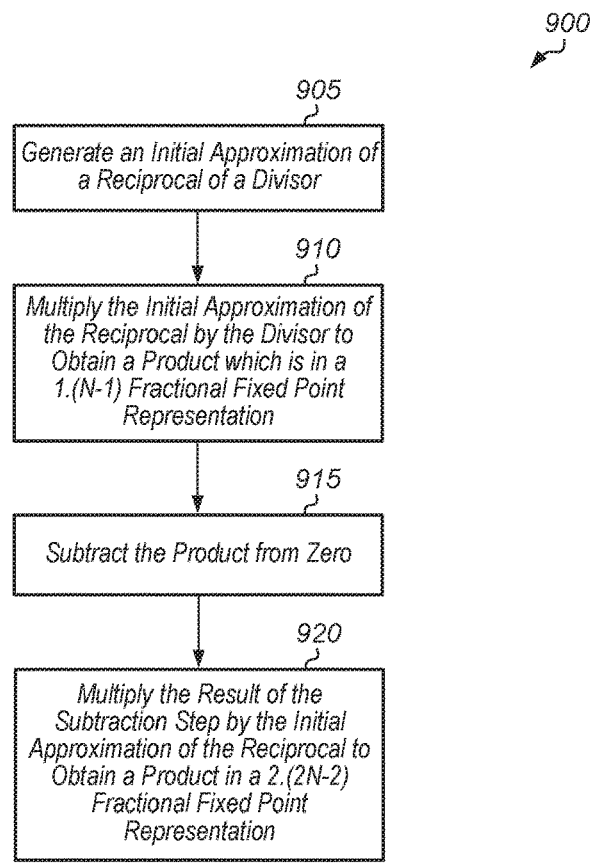
FIG. 9 is a generalized flow diagram illustrating one embodiment of a method for performing a portion of a division operation.

Referring now to FIG. 9, one embodiment of a method 900 for performing a portion of a division operation is shown. During a division operation, a processor generates an initial approximation of a reciprocal of a divisor (block 905). In some embodiments, the initial approximation of the divisor is biased by introducing a small error into the initial approximation. Then, the initial approximation of the reciprocal is multiplied by the divisor to obtain a product which is in a 1·(N−1) fractional fixed point representation (block 910). This product is then subtracted from zero (block 915). Then, the result of the subtraction step is multiplied by the initial approximation of the reciprocal to obtain a product in a 2·(2N−2) fractional fixed point representation (block 920). After block 920, method 900 ends. It is noted that additional Newton-Raphson iterations can be performed after block 920 in various embodiments as part of the overall division operation.

Figure 10:
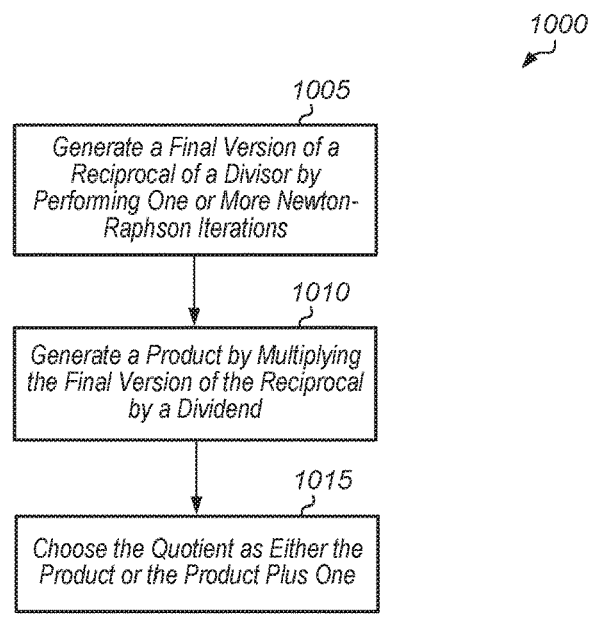
FIG. 10 is a generalized flow diagram illustrating one embodiment of a method for selecting a final result of a division operation.

Turning now to FIG. 10, one embodiment of a method 1000 for selecting a quotient of a division operation is shown. During a division operation, a processor generates a final version of a reciprocal of a divisor by performing one or more Newton-Raphson iterations (block 1005). Next, the processor generates a product by multiplying the final version of the reciprocal by a dividend (block 1010). Then, the processor chooses the quotient as either the product or the product plus one (block 1015). In the prior art, the final choice is made between the product, the product plus one, and the product minus one. After block 1015, method 1000 ends.

Figure 11:
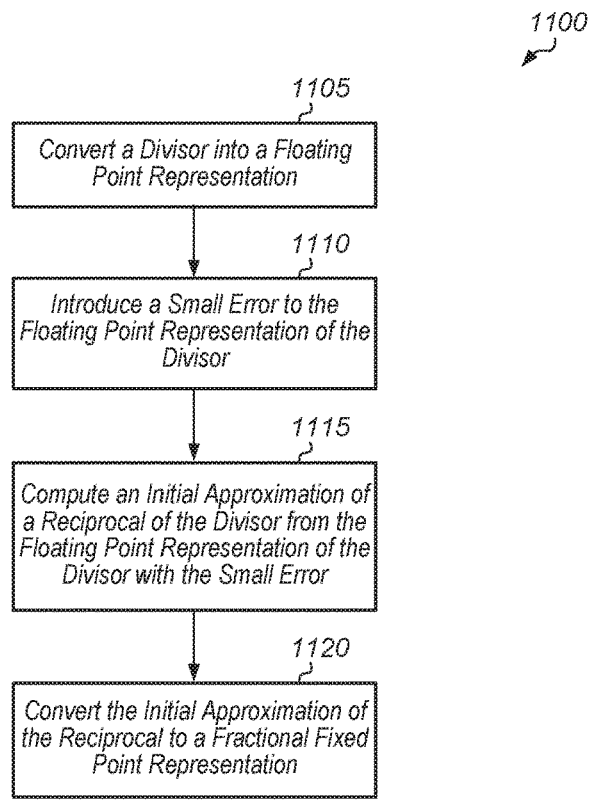
FIG. 11 is a generalized flow diagram illustrating one embodiment of a method for introducing an error into an early stage of a division operation.

Referring now to FIG. 11, another embodiment of a method 1100 for introducing an error into an early stage of a division operation is shown. During a division operation, a processor converts a divisor into a floating point representation (block 1105). Next, the processor introduces a small error to the floating point representation of the divisor (block 1110). The small error can be introduced using any of the previously described techniques. Then, the processor computes an initial approximation of a reciprocal of the divisor from the floating point representation of the divisor with the small error (block 1115). Next, the processor converts the initial approximation of the reciprocal to a fractional fixed point representation (block 1120). After block 1120, method 1100 ends. It is noted that one or more Newton-Raphson iterations can be performed after block 1120 as part of the overall division operation.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a memory; and
a processor coupled to the memory;
wherein the processor is configured to:
    detect a request to perform a division operation with a dividend and a divisor;
    responsive to detecting the request:
        generate an initial approximation of a reciprocal of the divisor in a N-bit floating point representation, wherein N is a positive integer;
        convert the initial approximation of the reciprocal of the divisor from the N-bit floating point representation to a fractional fixed point representation, wherein the fractional fixed point representation is a 1·(N−1)-bit fractional fixed point representation, wherein one bit is above a radix point and N−1 bits are below the radix point in the 1·(N−1)-bit representation;
        perform one or more iterations on the initial approximation of the reciprocal as converted to the fractional fixed point representation to generate a final version of the reciprocal; and
        perform a multiply operation of a final version of the reciprocal by the dividend to obtain a quotient as a result of the division operation.

2. The system as recited in claim 1, wherein performing a first iteration of the one or more iterations comprises:
multiplying the initial approximation of the reciprocal by the divisor to generate a product in a 1·(N−1) fractional fixed point representation;
subtracting the product from zero to generate a first quantity; and
multiplying the first quantity by the initial approximation of the reciprocal to generate a second approximation of the reciprocal in a 2·(2N−2) fractional fixed point representation.

3. The system as recited in claim 1, wherein the processor is configured to:
generate a product by multiplying the final version of the reciprocal by the dividend; and
choose the quotient from either the product or the product plus one.

4. The system as recited in claim 1, wherein the processor is further configured to insert an error either (i) into the divisor prior to generating the initial approximation of the reciprocal of the divisor or (ii) into the initial approximation of the reciprocal of the divisor.

5. The system as recited in claim 4, wherein inserting the error into the initial approximation of the reciprocal of the divisor changes the initial approximation of the reciprocal of the divisor by an amount equal to a least significant bit of the initial approximation of the reciprocal of the divisor.

6. A method for use in a computing device, the method comprising:
   detecting a request to perform a division operation with a dividend and a divisor;
   responsive to detecting the request:
      generating, by a processor, an initial approximation of a reciprocal of the divisor in a N-bit floating point representation, wherein N is a positive integer;
      converting, by the processor, the initial approximation of the reciprocal of the divisor from the N-bit floating point representation to a fractional fixed point representation, wherein the fractional fixed point representation is a 1·(N−1)-bit fractional fixed point representation, wherein one bit is above a radix point and N−1 bits are below the radix point in the 1·(N−1)-bit representation;
      performing, by the processor, one or more iterations on the initial approximation of the reciprocal as converted to the fractional fixed point representation to generate a final version of the reciprocal; and
      performing, by the processor, a multiply operation of a final version of the reciprocal by the dividend to obtain a quotient as a result of the division operation.

7. The method as recited in claim 6, wherein performing a first iteration of the one or more iterations comprises:
   multiplying the initial approximation of the reciprocal by the divisor to generate a product in a 1·(N−1) fractional fixed point representation;
   subtracting the product from zero to generate a first quantity; and
   multiplying the first quantity by the initial approximation of the reciprocal to generate a second approximation of the reciprocal in a 2·(2N−2) fractional fixed point representation.

8. The method as recited in claim 6, further comprising:
   generating a product by multiplying the final version of the reciprocal by the dividend; and
   choosing the quotient from either the product or the product plus one.

9. The method as recited in claim 6, further comprising inserting an error either (i) into the divisor prior to generating the initial approximation of the reciprocal of the divisor or (ii) into the initial approximation of the reciprocal of the divisor.

10. The method as recited in claim 9, wherein inserting the error into the initial approximation of the reciprocal of the divisor changes the initial approximation of the reciprocal of the divisor by an amount equal to a least significant bit of the initial approximation of the reciprocal of the divisor.

11. A processor comprising:
   a register file; and
   one or more arithmetic logic units (ALUs);
   wherein the processor is configured to:
      detect a request to perform a division operation with a dividend and a divisor;
      responsive to detecting the request:
         generate an initial approximation of a reciprocal of the divisor in a N-bit floating point representation, wherein N is a positive integer;
         convert the initial approximation of the reciprocal of the divisor from the N-bit floating point representation to a fractional fixed point representation, wherein the fractional fixed point representation is a 1·(N−1)-bit fractional fixed point representation, wherein one bit is above a radix point and N−1 bits are below the radix point in the 1·(N−1)-bit representation;
         perform one or more iterations on the initial approximation of the reciprocal as converted to the fractional fixed point representation to generate a final version of the reciprocal; and
         perform a multiply operation of a final version of the reciprocal by the dividend to obtain a quotient as a result of the division operation.

12. The processor as recited in claim 11, wherein performing a first iteration of the one or more iterations comprises:
   multiplying the initial approximation of the reciprocal by the divisor to generate a product in a 1·(N−1) fractional fixed point representation;
   subtracting the product from zero to generate a first quantity; and
   multiplying the first quantity by the initial approximation of the reciprocal to generate a second approximation of the reciprocal in a 2·(2N−2) fractional fixed point representation.

13. The processor as recited in claim 11, wherein the processor is configured to:
   generate a product by multiplying the final version of the reciprocal by the dividend; and
   choose the quotient from either the product or the product plus one.

14. The processor as recited in claim 11, wherein the processor is further configured to insert an error either (i) into the divisor prior to generating the initial approximation of the reciprocal of the divisor or (ii) into the initial approximation of the reciprocal of the divisor.

* * * * *